United States Patent Office 3,042,711
Patented July 3, 1962

3,042,711
CHLORINATION REARRANGEMENT
AND PRODUCTS
John R. Clark, Nutley, N.J., assignor to S. B. Penick and Company, New York, N.Y., a corporation of Delaware
No Drawing. Filed Jan. 8, 1959, Ser. No. 785,562
10 Claims. (Cl. 260—482)

The present invention relates to chemical processes and chemical compounds.

In its process aspect, the present invention resides in the concept of the process of reacting thionyl chloride with an ethane stem nucleus compound having an unsubstituted carbamyloxy group attached to the terminal 1-position carbon atom, a hydroxy radical attached to the 2-position carbon atom, and an electron-attracting group attached to the 2-position carbon atom; whereby chlorination and rearrangement are effected and there is produced the corresponding 1-chloro-2-(unsubstituted carbamyloxy)-ethane stem nucleus compound.

According to the above-described process, it has been discovered that when a 1-carbamyloxy-2-hydroxy ethane stem nucleus compound having an electron-attracting group attached to the 2-position carbon atom is reacted with thionyl chloride, the carbamyloxy group rearranges or shifts from the 1-position carbon atom to the 2-position carbon atom, the hydroxy group is removed, and a chlorine atom attaches to the 1-position carbon atom.

In the process of the invention, the nitrogen atom of the carbamyl group of the starting material, which is the ethane stem nucleus compound, can be substituted with one or more organic radicals.

The process of the invention is carried out by mixing approximately a molar excess of thionyl chloride with a desired 1-carbamyloxy-2-hydroxy-ethane stem nucleus compound usually in a solvent. Among the solvents which can be employed are aromatic compounds as pyridine, benzene, toluene, and the like. The mixture is then heated, as to reflux, until the evolution of sulfur dioxide ceases. This point is evidenced by a constant internal temperature of the mixture. Thereafter, the solvent can be removed by distillation. The product can be recovered by conventional separation techniques appropriate to its physical state, such as washing and crystallization or distillation.

Definition of Terms

The term "ethane stem nucleus compound," as used herein, means an organic compound containing at least two carbon atoms attached to each other, one of which is the terminal carbon atom of an acyclic chain.

The term "electron-attracting group," as used herein, means an organic group capable of attracting electrons to activate the hydroxy- and carbamyloxy-substituted group to which it is attached, and is illustrated by the unsubstituted methyl group and methyl groups substituted with one or more organic radicals.

The term "organic radical," as used herein, means an organic radical which does not interfere with the chlorination and rearrangement reaction and includes aliphatic groups such as lower-alkyl groups as methyl, ethyl, isopropyl, tertiary-butyl, pentyl, hexyl, heptyl; loweralkenyl groups as vinyl, propenyl, butenyl, pentenyl, hexenyl, heptenyl; lower-alkynyl radicals as ethynyl, propynyl, butynyl, pentynyl, hexynyl, heptynyl, loweralkoxy groups as methoxy, ethoxy, propoxy; mono-carbocyclic groups including allicyclic groups as cyclobutyl, cyclopentyl, cyclohexyl, cyclohexenyl, o-methyl-cyclohexyl; aromatic groups as phenyl, tolyl, benzyl, naphthyl, anthracyl, phenanthryl; aromatic ether groups as phenoxy, o-chlorophenoxy, o-bromophenoxy, toloxy, o-methoxy-phenoxy, o-ethoxy-phenoxy, p-methoxy-phenoxy, 2-naphthyloxy; aromatic thioether groups as thiophenyl; and heterocyclic groups as c-pyridyl, piperidyl including N-piperidyl and C-piperidyl, piperazino including N-piperazino and C-piperazino, morpholino including N-morpholino and C-morpholino, pyrano, thienyl, furyl and furfuryl.

The term "lower organic radical," as used herein, means an organic radical containing 1 to 12 carbon atoms, inclusive.

The term "cyclic organic radical," as used herein, means an organic radical containing at least one ring.

The term "lower-aliphatic" as used herein, means aliphatic groups having from 1 to 6 carbon atoms inclusive and is illustrated by alkyl groups as methyl, ethyl, isopropyl, tertiary-butyl, hexyl; alkenyl groups as vinyl, propenyl, butenyl; alkinyl groups as ethinyl, propinyl, butinyl.

The term "lower-aryl," as used herein, means aryl groups having 1 to 12 carbon atoms inclusive and is illustrated by phenyl, tolyl, naphthyl, and substituted derivatives thereof.

The starting materials for the process of the invention can be prepared by reacting the corresponding substituted diol with a carbonic acid ester such as diethyl carbonate to form the cyclic carbonate or dioxolone; and then reacting the dioxolone with ammonia to rupture the dioxolone ring and produce the carbamate. Processes for accomplishing these steps are disclosed in United States Patent Number 2,770,649 to Murphey and United States Patent Number 2,813,104 to McDowell. Further disclosure of producing the starting materials for the process of the invention can also be found in Baizer et al., Journal of Organic Chemistry, volume 22, pages 1595 to 1599 (1957), and in co-pending application Serial No. 635,091, filed January 22, 1957, by Manuel M. Baizer.

Products produced by the invention are novel where the electron attracting group is cyclic. Thus, in its product aspect, the present invention resides in the concept of 1-chloro-2-substituted-3-substituted propanes wherein: the 2-substituent is an unsubstituted carbamyloxy group; and the 3-substituent is a cyclic organic radical. These products of the invention are useful as chemical intermediates. For example, the 1-chloro-2-carbamyloxy-3-cyclic organic-substituted propanes can be converted to 5-substituted-2-oxazolidones by acylation and cyclization procedures as set forth in the example since the 1-chloro-2-N-mono (lower organic radical-substituted)-carbamyloxy-3-cyclic-organic substituted propanes can be converted to oxazolidones by treatment with strong bases. As shown in U.S. Patent 2,826,587, the 5-substituted-2-oxazolidones are a well known class of compounds useful per se and as intermediates for the preparation of pure beta amino alcohols.

The following examples illustrate the physical embodiment of the inventive concepts.

*Example 1.—Conversion of 1-Carbamyloxy-2-Hydroxy-3-(o-Methoxy-Phenoxy)-Propane to 1-Chloro-2-Carbamyloxy-3-(o-Methoxy-Phenoxy)-Propane*

Mix 120.6 grams (0.50 mole) of 1-carbamyloxy-2-hydroxy-3-(o-methoxy-phenoxy)-propane, prepared as set forth in Baizer et al., Journal of Organic Chemistry, volume 22, pages 1595 to 1599 (1957), 47.5 grams (0.50 mole) of dry pyridine and 500 milliliters of dry benzene. While stirring the mixture and maintaining the temperature at 0 to 10 degrees centigrade, add 65.4 grams (0.55 mole) of thionyl chloride over a period of 1 hour. Heat the mixture slowly to reflux and maintain the mixture under reflux until the evolution of sulfur dioxide gas stops. The cessation of evolution of sulfur dioxide gas is evidenced by a constant internal temperature of the mixture. Thereafter, heat the mixture for an additional 30 minutes. Cool the reaction mixture to about 25 degrees centigrade. Add 200 milliliters of water. Two liquid phases form and crystallize rapidly. Filter the crystals and wash them, first with water and then with benzene, to produce 111.4 grams (87.6 percent yield) of 1 - chloro - 2 - carbamyloxy - 3 - (o - methoxy - phenoxy)-propane, melting at 105–106 degrees centigrade.

To convert this chemical intermediate to a 5-substituted-3-hydro-2-oxazolidone, mix 1 molar part of the foregoing 1 - chloro - 2 - carbamyloxy - 3 - (o - methoxy - phenoxy)-propane with a molar excess of acetic anhydride and a catalytic quantity of p-toluene sulfonic acid. Heat the mixture on a steam bath for one hour to form 1-chloro-2-(N - acetyl - carbamyloxy) - 3 - (o - methoxy - phenoxy)-propane. Thereafter, while heating the mixture to maintain it under reflux, add alcohol. The mixture dissolves in the alcohol. Next, while maintaining the solution at about 70 degrees centigrade, add a molar excess of sodium hydroxide. A precipitate forms shortly after the completion of the addition of the sodium hydroxide. Stir and cool the mixture for one hour. Filter and dry the precipitate to produce 5-(o-methoxy-phenoxymethyl)-2-oxazolidone.

*Example 2.—Conversion of 1-(N-Ethylcarbamyloxy)-2-Hydroxy Propane to 1-Chloro-2(N-Ethylcarbamyloxy)-Propane*

By the method outlined by Baizer et al., Journal of Organic Chemistry, volume 22, pages 1706 to 1707 (1957), treat propylene glycol with a deficiency of phosgene in benzene to form a chlorocarbonate. React the intermediate chlorocarbonate with ethylamine to produce 1-(N-ethyl-carbamyloxy)-2-hydroxy-propane boiling at 99 degrees centigrade at a pressure of 0.4 millimeter of mercury and having a refractive index at 20 degrees centigrade for the yellow D line of sodium light of 1.4548. The phenyl-urethane derivative of this compound melts at 95.2–96.4 degrees centigrade.

Place 0.1 mole of the 1-(N-ethylcarbamyloxy)-2-hydroxy-propane in a reaction flask. Add slowly 0.2 mole of thionyl chloride while cooling the reaction flask with a water bath. Then heat the mixture under reflux for 3 hours. Remove the excess thionyl chloride by distillation. Dissolve the residue in 100 milliliters of benzene. Wash the solution successively with water, four portions of 5 percent sodium bicarbonate, water, 25 milliliters of 5 percent hydrochloric acid, and again water. Dry the solution over sodium sulfate. Strip the benzene from the dried solution by fractional distillation. Fractionally distill residue under vacuum to obtain 1-chloro-2-(N-ethylcarbamyloxy)-propane boiling at 68–69 degrees centigrade at a pressure of 0.5 millimeter of mercury and having a refractive index at 20 degrees centigrade for the yellow D line of sodium light of 1.4530.

*Example 3.—Conversion of 1-Carbamyloxy-2-Hydroxy-3-(o-Chloro-Phenoxy)-Propane to 1-Chloro-2-Carbamyloxy-3-(o-Chlorophenoxy)propane*

Prepare the starting material, 1-carbamyloxy-2-hydroxy-3-(o-chloro-phenoxy)-propane as follows. Add 202.5 grams (1 mole) of 3-(o-chlorophenoxy)-1,2-propanediol to a reaction flask. Heat the flask to 100 degrees centigrade to melt the diol. Add 2.8 grams of sodium methylate to the molten diol. Add 236 grams (2 moles) of di-ethyl carbonate to the mixture. Heat the mixture to distill off the alcohol formed by the reaction through a fractionating column. After the theoretical quantity of alcohol has distilled off, add 3.0 grams of ammonium chloride to the mixture to destroy the sodium methylate catalyst and arrest further reaction. Distill off the excess diethyl carbonate under reduced pressure. Remove a sample of the material for analysis of the cyclic carbonate. Crystallize the sample twice from anhydrous isopropanol to obtain 4-(o-chlorophenoxy-methyl)-dioxolone melting at 109.0–109.3 degrees centigrade and having the following analysis; based on an empirical formula of $$C_{10}H_9O_4Cl$$

|  | Percentage of Weight | |
|---|---|---|
|  | Carbon | Hydrogen |
| Calculated | 52.52 | 3.93 |
| Found | 53.15 | 3.96 |

Next, the 4-(o-chlorophenoxymethyl)-dioxolone is ammonolyzed into a mixture of the isomers 1-hydroxy-2-carbamyloxy-3-(o-chlorophenoxy)-propane and 1-carbamyloxy-2-hydroxy-3-(o-chlorophenoxy)-propane. Stir the crude 4-(o-chlorophenoxymethyl)-dioxolone overnight with 1200 milliliters of isopropanol containing 34 grams (2 moles) of anhydrous ammonia. Heat the mixture to reflux in order to remove excess ammonia. Add charcoal and mix. Filter. Allow the filtrate to cool with resultant precipitation of crude 1-carbamyloxy-2-hydroxy-3-(o-chlorophenoxy)-propane. Filter, concentrate the filtrate and cool to obtain a second crop of this compound. Repeat the concentration and crystallization to obtain several further crops of crude 1-carbamyloxy-2-hydroxy-3-(o-chlorophenoxy)-propane. After several concentrations, evaporate the filtrate to dryness. Fractionally crystallize the residue remaining after evaporation from ethyl acetate solvent to obtain crystalline 1-hydroxy-2-carbamyloxy-3-(o-chlorophenoxy)-propane. The total crystalline product obtained is 230 grams (94 percent yield).

The pure 1-carbamyloxy-2-hydroxy-3-(o-chlorophenoxy)-propane melts at 98.4–98.9 degrees centigrade and has the following analysis; based on an empirical formula of $C_{10}H_{12}ClN$:

|  | Percent by Weight | | |
|---|---|---|---|
|  | Carbon | Hydrogen | Nitrogen |
| Calculated | 48.87 | 4.92 | 5.70 |
| Found | 48.99 | 5.16 | 5.74 |

The pure 1-hydroxy-2-carbamyloxy-3-(o-chlorophenoxy)-propane melts at 123.2–123.5 degrees centigrade and has the following analysis; based on an empirical formula of $C_{10}H_{12}O_4ClN$:

|  | Percent by Weight | | |
|---|---|---|---|
|  | Carbon | Hydrogen | Nitrogen |
| Calculated | 48.87 | 4.92 | 5.70 |
| Found | 49.49 | 5.01 | 6.07 |

The chlorination and rearrangement is next performed as follows: Stir 36.75 grams (0.15 moles) of 1-carbamyloxy-2-hydroxy-3-(o-chlorophenoxy)-propane in 150 milliliters of dry toluene. Add 19.5 grams of thionyl chloride. Slowly heat the mixture to reflux temperature. Maintain the temperature at about 110 degrees centigrade for 2 hours. Cool the mixture with the resultant formation of a voluminous precipitate. Filter the solid melting at 81.0–82 degrees centigrade. Recrystallize the solid from isopropanol solvent to obtain 1-chloro-2-carbamyloxy-2-(o-chlorophenoxy)-propane melting at 81.2–82.0 degrees centigrade and having the following analysis, based on an empirical formula of $C_{10}H_{11}Cl_2NO_3$:

|  | Percent by Weight | | |
|---|---|---|---|
|  | Carbon | Hydrogen | Nitrogen |
| Calculated | 45.45 | 4.17 | 5.30 |
| Found | 45.72 | 4.35 | 5.48 |

The use of the 1-chloro-2-carbamyloxy-3-(o-chlorophenoxy)-propane as a chemical intermediate is illustrated as follows: Mix 5.28 grams (0.02 mole) of the 1-chloro-2-carbamyloxy - 3 - (o - chlorophenoxy) - propane with 0.03 gram of zinc chloride and 2.3 grams of acetic anhydride in a reaction flask. Place an oil bath around the reaction flask. Heat the oil bath to a temperature of 100–120 degrees centigrade for three hours. A hard paste forms in the reaction flask. Crystallize the paste from a solvent mixture of ethanol and water to obtain crystals melting at 66.5–69.0 degrees centigrade. Recrystallize from pentane solvent to obtain 1-chloro-2-(N-acetylcarbamyloxy)-3-(o-chlorophenxy)-propane melting at 69.7–70.2 degrees centigrade, having the following analysis based on an empirical formula of $C_{12}H_{13}Cl_2NO_4$:

|  | Percentage by Weight | | |
| --- | --- | --- | --- |
|  | Carbon | Hydrogen | Nitrogen |
| Calculated | 47.08 | 4.28 | 4.57 |
| Found | 46.80 | 4.00 | 4.61 |

Treat the 1 - chloro - 2 - (N-acetylcarbamyloxy)-3-(o-chlorophenoxy)-propane with 10 percent aqueous sodium hydroxide solution to obtain a clear solution in which a precipitate soon forms at a pH of 11.0. Filter the crystalline product (about 70 percent yield). Recrystallize the product from ethyl acetate solvent to obtain 5-(2-chlorophenoxymethyl)-2-oxazolidone melting at 150.5–150.8 degrees centigrade. A melting point of 151 degrees centigrade for this compound was found by Beasley et al., Journal of Pharmacy and Pharmacology, London, volume IX, page 13.

*Example 4.—Conversion of 1-Carbamyloxy-2-Hydroxy-3-(o-Methyl-Phenoxy)-Propane to 1-Chloro-2-Carbamyloxy-3-(o-Methyl-Phenoxy)-Propane*

Prepare the starting material, 1-carbamyloxy-2-hydroxy-3-(o-methyl-phenoxy)-propane, as follows. React diethyl carbonate with 3-(o-methyl-phenoxy)-1,2-propanediol to produce 4-(o-methylphenoxymethyl)-dioxolone-2, melting at 95.4–96.0 degrees centigrade. See Ludwig et al., Journal of the American Chemical Society, volume 73, page 5894. Then ammonolyze the 4-(o-methylphenoxymethyl)-dioxolone-2 with ammonia to produce a mixture of 1 - hydroxy - 2 - carbamyloxy-3-(o-methylphenoxy)-propane melting at 115.0–115.6 degrees centigrade and 1-carbamyloxy2-hydroxy-3-(o-methylphenoxy) - propane melting at 92.0–93.0 degrees centigrade. The latter compound was disclosed by Yale et al., Journal of the American Chemical Society, volume 72, page 3715. Separate the isomers by fractional crystallization.

Mix 1 part by weight of the 1-carbamyloxy-2-hydroxy-3-(o-methyl-phenoxy)-propane with a molar excess of thionyl chloride in toluene solvent. Heat the mixture to reflux and continue heating until the evolution of sulfur dioxide gas ceases. Bubble air through the reaction mixture to sweep out the gases. Cool the mixture and recover, using procedures as set forth in the previous examples, 1-chloro-2-carbamyloxy-3-(o-methyl - phenoxy)-propane melting at 87.2–88.0 degrees centigrade and having the following analysis, based on an empirical formula of $C_{11}H_{14}ClNO_3$:

|  | Percentage by Weight | | | |
| --- | --- | --- | --- | --- |
|  | Carbon | Hydrogen | Nitrogen | Chlorine |
| Calculated | 54.21 | 5.79 | 5.75 | 14.55 |
| Found | 54.36 | 6.04 | 5.68 | 14.30 |

*Example 5.—Conversion of 1-Carbamyloxy-2-Hydroxy-3-(2-Naphthyloxy)-Propane to 1-Chloro-2-Carbamyloxy-3-(2-Naphthyloxy)-Propane*

Prepare the starting material, 1 - carbamyloxy - 2 - hydroxy-(2-naphthyloxy)-propane, as follows. React diethyl carbonate with 3-(2-naphthyloxy)-1,2-propanediol, in a manner similar to that set forth in the preceding examples, to produce 4-(2-naphthyloxymethyl)-dioxolone-2, melting at 127.0–127.5 degrees centigrade. Then ammonolyze this 4-(2-naphthyloxymethyl)-dioxolone-2 with ammonia to produce a mixture of 1-hydroxy-2-carbamyloxy-3-(2-naphthyloxy)-propane melting at 150.8–151.0 degrees centigrade and 1-carbamyloxy-2-hydroxy-3-(2-naphthyloxy)-propane melting at 144.5–145.0 degrees centigrade. Separate the isomers by fractional crystallization.

Mix 1 part by weight of the 1-carbamyloxy-2-hydroxy-3-(2-naphthyloxy)-propane with a molar excess of thionyl chloride in toluene solvent. Heat the mixture to reflux and continue heating until the evolution of sulfur dioxide gas ceases. Bubble air through the reaction mixture to sweep out the gases. Cool the mixture and recover, using procedures as set forth in the previous examples, 1-chloro-2-carbamyloxy-3-(2 - naphthyloxy) - propane melting at 125.5–126.0 degrees centigrade having the following analysis, based on an empirical formula of $C_{14}H_{14}ClNO_3$:

|  | Percentage by Weight | | | |
| --- | --- | --- | --- | --- |
|  | Carbon | Hydrogen | Nitrogen | Chlorine |
| Calculated | 60.11 | 5.05 | 5.01 | 12.67 |
| Found | 60.05 | 5.01 | 5.45 | 12.05 |

*Example 6.—Conversion of 1-Carbamyloxy-2-Hydroxy-3-(N-Piperidino)-Propane to 1-Chloro-2-Carbamyloxy-3-(N-Piperidino)-Propane*

Prepare the starting material, 1-carbamyloxy-2-hydroxy-3-(N-piperidino)-propane, using procedures as set forth in the previous examples. This compound melts at 121.5–122.0 degrees centigrade and has the following analysis, based on an empirical formula of $C_9H_{18}N_2O_3$:

|  | Percentage by Weight | | |
| --- | --- | --- | --- |
|  | Carbon | Hydrogen | Nitrogen |
| Calculated | 53.39 | 8.97 | 13.85 |
| Found | 52.99 | 8.79 | 13.71 |

Mix 1 part by weight of the 1-carbamyloxy-2-hydroxy-3-(N-piperidino)-propane with 3 parts of thionyl chloride. Heat the mixture to 50° C. and continue heating until the evolution of sulfur dioxide gas ceases. Bubble air through the reaction mixture to sweep out the gases. Distill excess thionyl chloride, cool the mixture, neutralize with sodium carbonate solution and recover, using procedures as set forth in the previous examples, 1-chloro-2-carbamyloxy-3-(N-piperidino)-propane as the monohydrate, melting at 142–143 degrees centigrade and having the following analysis, based on an empirical formula of $$C_9H_{17}ClN_2O_2 \cdot H_2O$$

|  | Percentage by Weight | | | |
| --- | --- | --- | --- | --- |
|  | Carbon | Hydrogen | Chlorine | Nitrogen |
| Calculated | 45.69 | 8.02 | 14.85 | 11.73 |
| Found | 45.56 | 7.84 | 15.20 | 11.57 |

The invention can be embodied in other specific forms without departing from the spirit or essential characteristics thereof. The foregoing physical embodiments are

I claim.
1. A composition of matter having the molecular structure 1-chloro-2-carbamyloxy-3-(o-methoxy-phenoxy)-propane.
2. A composition of matter having the molecular structure 1-chloro-2-carbamyloxy-3-(o-chloro-phenoxy)-propane.
3. A composition of matter having the molecular structure 1-chloro-2-carbamyloxy-3-(o-methylphenoxy)-propane.
4. A composition of matter having the molecular structure 1-chloro-2-carbamyloxy-3-(2-naphthyloxy)-propane.
5. The process which includes: heating a mixture of thionyl chloride with a 1-carbamyloxy-2-hydroxy-3-substituted propane compound wherein the 3-substituent is an ortho substituted phenoxy radical selected from the group consisting of loweralkylphenoxy, loweralkoxyphenoxy, and halophenoxy, to effect chlorination and rearrangement thereby producing the corresponding 1-chloro-2-carbamyloxy-3-substituted propane compound.
6. The process as set forth in claim 5 wherein said heating is done under reflux conditions.
7. 1-chloro-2-carbamyloxy-3-substituted propane compounds wherein the 3-substituent is an ortho substituted phenoxy radical selected from the group consisting of loweralkylphenoxy, loweralkoxyphenoxy, and halophenoxy.
8. Compounds according to claim 7 wherein the phenoxy radical is loweralkylphenoxy.
9. Compounds according to claim 7 wherein the phenoxy radical is loweralkoxyphenoxy.
10. Compounds according to claim 7 wherein the phenoxy radical is halophenoxy.

References Cited in the file of this patent

Chabrier et al.: "Compt. Rend.," vol. 238, pages 1593–5 (1954).

Najer et al.: "Compt. Rend.," vol. 238, pages 690–692 (1954).